Patented Oct. 30, 1951

2,573,302

UNITED STATES PATENT OFFICE 2,573,302

PRODUCTION OF ORGANO-SILICON DERIVATIVES

Auguste Florentin Bidaud, Serezin-du-Rhone, and Pierre Dumont, Lyon, France, assignors to Societe des Usines Chimiques Rhone-Poulenc, Paris, France, a French body corporate No Drawing. Application September 16, 1947, Serial No. 774,418. In France July 23, 1947

1 Claim. (Cl. 260—448.2)

This invention relates to the production of organo-silicon derivatives and particularly to the production of methylsilyl acetates.

In our application No. 735,798, filed March 19, 1947, now abandoned, a process is described for the preparation of the acetates of dimethylsilyl and of monomethylsilyl by the action of acetic anhydride on the corresponding methylchlorsilanes. The methylsilyl acetates thus produced are mixed with the excess acetic anhydride, and also with acetyl chloride which is formed in the course of the reaction. The separation of these products affords no difficulty, but the production of large quantities of acetyl chloride restricts the economic industrial preparation of the methylsilyl acetates by this method to those who can make use of this acetyl chloride.

On the other hand, when the acetic anhydride process is applied to trimethyl chlorsilane there is obtained, not the corresponding acetate, but hexamethyldisiloxane.

It has now been found, and this forms the basis of the present invention, that if, instead of acetic anhydride, an anhydrous salt of acetic acid is caused to act on methylchlorsilanes, the corresponding acetates of methylsilyl are obtained in all cases.

According to the present invention therefore, a method for the preparation of methylsilyl acetates comprises causing an anhydrous salt of acetic acid to act on methylchlorsilanes, and separating the methylsilyl acetates formed.

The anhydrous salt of acetic acid employed may be, for example, sodium acetate, which is particularly suitable.

The reaction takes place at room temperature and is exothermic. The mass may be allowed to become heated, but it is necessary to prevent the evaporation of the volatile chlorsilanes, if need be by cooling, in order to maintain them in reaction. If desired, it is possible to operate in the presence of a solvent or diluent such as ether, but this is not essential. When the reaction is complete, the methylsilyl acetates are separated from the medium in which they have been formed, and if desired separated from one another, by extraction or more simply by distillation.

One of the advantages of the present invention resides in the fact that it permits of a simple separation of the variously substituted methylsilane derivatives. As the boiling points of chlorinated derivatives are similar to one another (the difference between the boiling points of dimethyl and monomethyl chlorsilane is about 3°), this separation is difficult and requires powerful rectifying plant of which the productivity is relatively low. On the other hand, the difference between the boiling points of the methylsilyl acetates is much greater and separation by rectification offers no particular difficulty. Moreover, the products obtained are crystallisable, so that they can be obtained in a highly pure state.

The process also enables the methylsilane derivatives to be separated from any silicon tetrachloride, which may also be present in the reaction mixture, the latter substance yielding under these conditions a tetra-acetyl derivative which is non-volatile.

Methylsilyl acetates have technical uses, either separately or in admixture, in particular for impregnation and waterproofing.

The following examples, in which the parts are by weight, serve to illustrate the invention but are not intended to limit the invention in any way.

Example I 75 parts of monoethyltrichlorsilane are added gradually with agitation to 130 parts of anhydrous sodium acetate.

The mixture becomes heated and the moderate temperature of about 65° C. is maintained. The temperature is then raised in vacuo in order to distil the triacetate of methylsilyl formed (about 100 parts). This acetate boils at about 90° C. under 4 mm. and melts at about 40° C. The acidity value (in ccs. of N/2 alkali per gram) was found to be 27.2 (theory 27.27).

Example II

By proceeding as in Example I, but replacing the monomethyltrichlorsilane by 97 parts of dimethyldichlorsilane, the diacetate of dimethylsilyl boiling at about 155° C. is obtained.

Example III

Trimethylsilyl mono-acetate is prepared by gradually adding 217 parts by weight of trimethylmonochlorsilane to 170 parts of anhydrous sodium acetate. The mixture is maintained at about 45° C. for 3 hours, whereafter the temperature is gradually raised to distil the trimethylsilyl monoacetate formed. This acetate, which has an acidity of 15.4 (theory $(CH_3)_3SiOCOCH_3$: 15.15), can be rectified and then distils at 102–103° C. and crystallises at about −48° C.

Example IV 109 parts of trimethylmonochlorsilane are gradually added to 184 parts of anhydrous zinc

| | Theoretical acidity | Solidifying point | $d_{20}$ | $nd$ | Boiling Point |
|---|---|---|---|---|---|
| | | °C. | | | |
| Trimethylsilyl monoacetate | 15.15 | −51 | 0.88 | 1.388 | 102° C. |
| Dimethylsilyl diacetate | 22.70 | −12.5 | 1.06 | 1.403 | B. P. 163° C. / B. P.$_{85}$ 100° C. |
| Monomethylsilyl triacetate | 22.27 | +41.4 | 1.17 | 1.407 | B. P. ca. 200° C. / B. P.$_3$ 100° C. | acetate, whereafter the mixture is maintained for two hours at about 40° C.

The trimethylsilyl acetate formed is then eliminated by distillation.

Example V

This example concerns the treatment of mixtures of methylchlorsilanes and their preparation in the form of methylsilyl acetate.

167 parts of a mixture of mono-, di- and trimethylchlorsilanes which distil at about 55°–70° C., are gradually added to 207 parts of anhydrous sodium acetate. After reaction has occurred, the trimethylsilyl acetate is first eliminated by distillation by heating the mixture to about 110° C. The dimethylsilyl diacetate is then first removed in vacuo, followed by the monomethylsilyl triacetate.

By rectification, purer products can be obtained which have the following characteristics:

When the rectification is well conducted, the characteristics of the acetates of monomethylsilyl and of trimethylsilyl remain substantially unchanged upon subjection of these products to fractional crystallisation.

We claim:

A process for the production of individual methylsilyl acetates from a mixture of at least two methylchlorosilanes selected from the group consisting of monomethyltrichlorosilane, dimethyldichlorosilane and trimethylchlorosilane, which comprises reacting said mixture with an anhydrous salt of acetic acid to form a mixture of the corresponding methylsilyl acetates the individual components of which have markedly different boiling characteristics, and separating by selective distillation the individual methylsilyl acetates from the mixture thus produced.

AUGUSTE FLORENTIN BIDAUD.
PIERRE DUMONT.

REFERENCES CITED

The following references are of record in the file of this patent:

UNITED STATES PATENTS

| Number | Name | Date |
|---|---|---|
| 2,405,988 | Barry | Aug. 20, 1946 |

OTHER REFERENCES

Schuyten et al., "Jour. Am. Chem. Soc.," vol. 69 (1947), pages 2110–2112.

Sauer et al., "Jour. Am. Chem. Soc.," vol. 67 (1945), pages 1548, 1549.